United States Patent [19]
Parran

[11] 3,853,413
[45] Dec. 10, 1974

[54] SNAP RING LOCKING DEVICE
[75] Inventor: Mario A. Parran, Norwalk, Ohio
[73] Assignee: General Motors Corporation, Detroit, Mich.
[22] Filed: Feb. 7, 1974
[21] Appl. No.: 440,453

[52] U.S. Cl. .............................. 403/318, 403/326
[51] Int. Cl. ............................................. F16d 1/06
[58] Field of Search ......... 85/8.6, 8.8, 8.9; 277/218, 277/219; 285/321; 292/256.61, 256.69, 256.63, 256.65; 403/318, 326

[56] References Cited
UNITED STATES PATENTS
| | | | |
|---|---|---|---|
| 1,694,354 | 12/1928 | Rollason | 85/8.6 |
| 2,960,359 | 11/1960 | Leland | 403/318 |
| 3,077,811 | 2/1963 | Moore | 85/8.6 |
| 3,446,522 | 5/1969 | Hoard | 85/8.8 |

Primary Examiner—Andrew V. Kundrat
Attorney, Agent, or Firm—F. J. Fodale

[57] ABSTRACT

A snap ring locking device for an internal snap ring comprises an arcuate key permanently deformed to a flattened condition between the ends of the snap ring. The ends of the snap ring and the key are cooperatively rabbetted to retain the key in an operative position where the key retains the snap ring peripherally seated in an internal groove.

2 Claims, 4 Drawing Figures

PATENTED DEC 10 1974 3,853,413

SNAP RING LOCKING DEVICE

This invention relates generally to snap rings and more particularly to means for preventing an internal snap ring from contracting and disengaging from the snap ring groove.

In the past, snap ring locking devices engaging the ends of the snap ring to prevent its contraction have been known. One such device is illustrated in U.S. Pat. No. 2,960,359 issued to Frank G. Leland on Nov. 15, 1960 and assigned to the assignee of this invention.

An object of this invention is to generally improve upon the snap ring locking device disclosed in the aforementioned patent.

The exact nature of this invention as well as other objects and advantages thereof will be readily apparent from consideration of the following specification relating to the annexed drawings in which.

Figure 1:
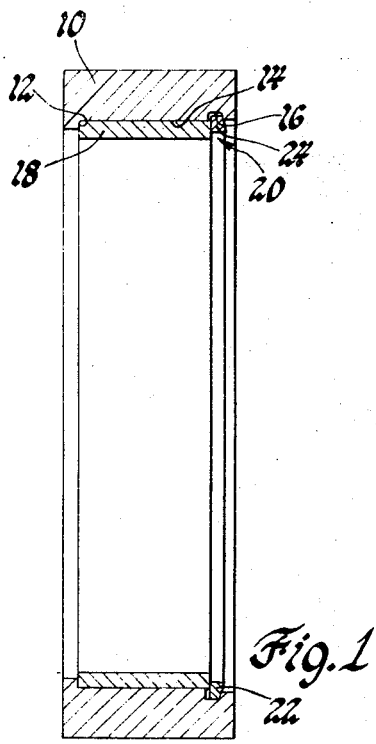
FIG. 1 is an axial section of a snap ring locking device in accordance with my invention.

Referring now to the drawings and more particularly to FIG. 1, a first member 10 such as a housing has an internal shoulder 12, a bore 14 and an internal groove 16 which opens into the bore 14. A concentric inner member 18 is disposed in the housing 10 against the internal shoulder 12 and retained therein by the snap ring locking device generally indicated at 20.

The snap ring locking device 20 comprises two pieces — a resilient spring tempered snap ring 22 with special ends and a deformable key 24. The snap ring 22 being resilient and spring tempered is circumferentially squeezed and inserted through the open end of the bore 14 into alignment with the internal groove where it expands under its own force and peripherally seats in the internal groove 16. When seated in the internal groove 16, a portion of the snap ring 22 protrudes radially inwardly of the bore 14 and engages the end of the inner member 18 to retain the inner member 18 in the housing 10 tightly against the shoulder 12 by a wedging action.

Figure 2:
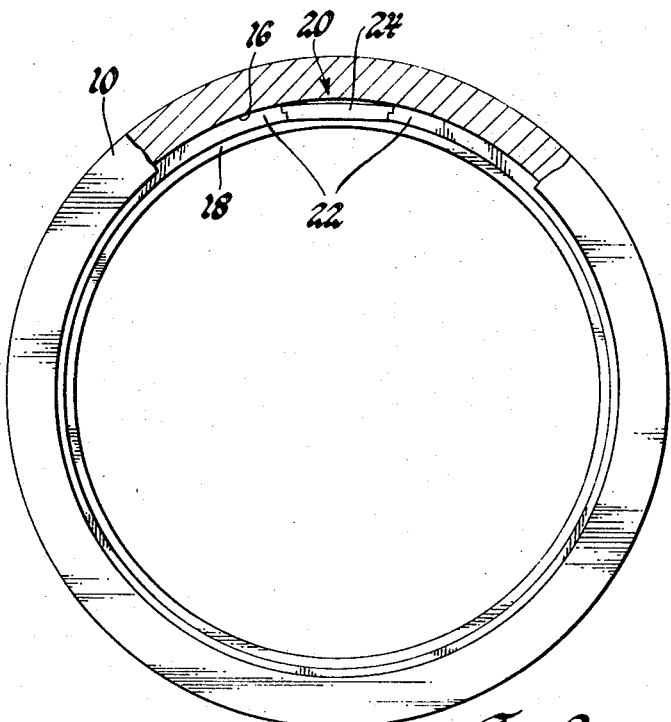
FIG. 2 is a front view of the snap ring locking device shown in FIG. 1 partially broken away and sectioned.
Figure 3:
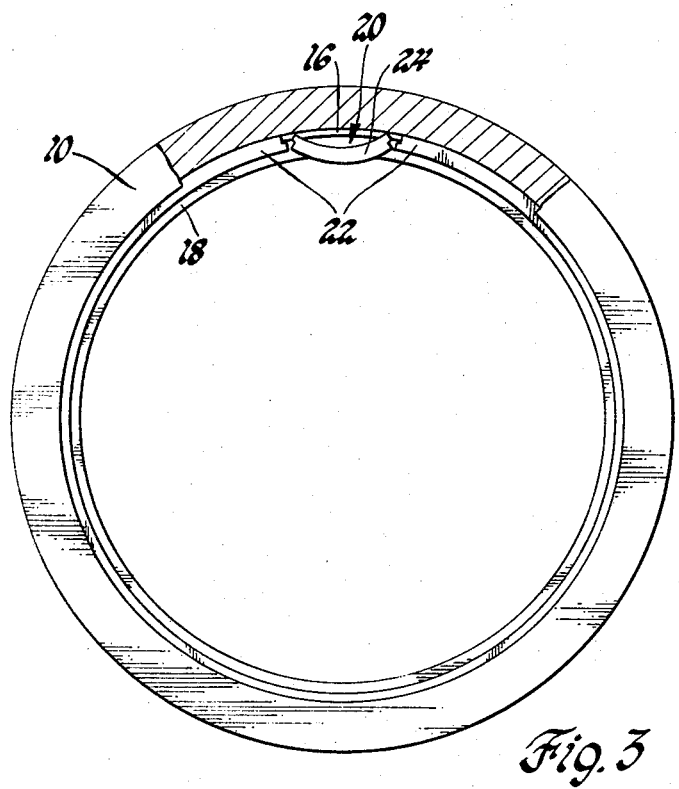
FIG. 3 is a view similar to FIG. 2 showing the snap ring locking device prior to the assembly of the key into its operative position.
Figure 4:
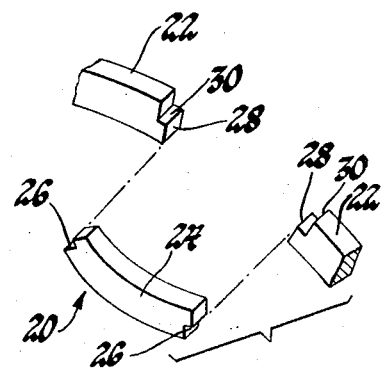
FIG. 4 is a perspective view of the end portions of the snap ring and the key shown in FIG. 3.

In order to prevent the snap ring from collapsing or being vibrated loose, the snap ring 22 is retained in its operative position within the groove 16 by the deformable key 24. As best seen in FIG. 4 the deformable key 24 comprises an arcuate segment having inner rabbets 26 at each end. The ends 28 of the snap ring have complementary outer rabbets 30. In its initial undeformed state the arcuate deformable key 24 is dimensioned so that the greatest width between the end is no greater than the minimum width between the ends 28 of the snap ring 22 permitting the key to be radially inserted into the groove 16 between the ends 28 of the snap ring as shown in FIG. 3. When in such a position the key is squeezed radially outwardly and permanently deformed to the flattened shape shown in FIG. 2 where the ends of the key 24 engage the ends of the snap ring 22 and force the snap ring 22 deeper into the groove further increasing the wedging action of the snap ring 22. Due to the rabbetting of the ends of the key 24 and the complementary rabbetting of the ends of the snap ring 22, the key is locked in place and the snap ring cannot thereafter collapse or vibrate loose from engagement with the groove 16.

While I have illustrated my invention in connection with a snap ring 22 which is tapered in cross section and which holds a second member in assembly with a first member, it is to be understood that my invention is applicable to other types of snap rings such as those of rectangular section and other types of application such as those wherein the snap ring merely provides an internal stop. In other words I wish it to be understood that I do not desire to be limited to the exact details of construction shown and described, for obvious modifications will occur to a person skilled in the art.

What is claimed is:

1. A snap ring locking device comprising:
   a member having an internal groove opening into a bore of the member,
   a resilient snap ring peripherally seated in said internal groove and protruding radially inwardly of said bore, said ring having an outer rabbet at each end, and
   a permanently deformed key disposed in said internal groove and engaging the ends of said resilient snap ring to retain said resilient snap ring peripherally seated in said groove,
   said key having an inner rabbet at each end and interlocking with said ends of said snap ring for radially retaining said key in said groove between the ends of said snap ring.

2. A snap ring locking device comprising:
   a first member having an internal groove opening into a bore of the first member, id internal groove having a tapered radial wall,
   a second member disposed in the bore of the first member,
   a resilient snap ring having a tapered cross section peripherally seated in said internal groove and protruding radially inwardly of said bore and engaging an end face of said second member, said snap ring having an outer rabbet at each end, and
   a reversely arcuate key permanently deformed to a flattened state in said internal groove engaging the ends of said resilient snap ring wedging said resilient snap ring into tight engagement with said groove and said end face of said second member,
   said key having an inner rabbet at each end and interlocking with said ends of said snap ring for radially retaining said permanently deformed key in said groove between the ends of said snap ring.

* * * * *